No. 876,723. PATENTED JAN. 14, 1908.
W. A. LEONARD.
TAP HOLDER.
APPLICATION FILED MAY 27, 1907.
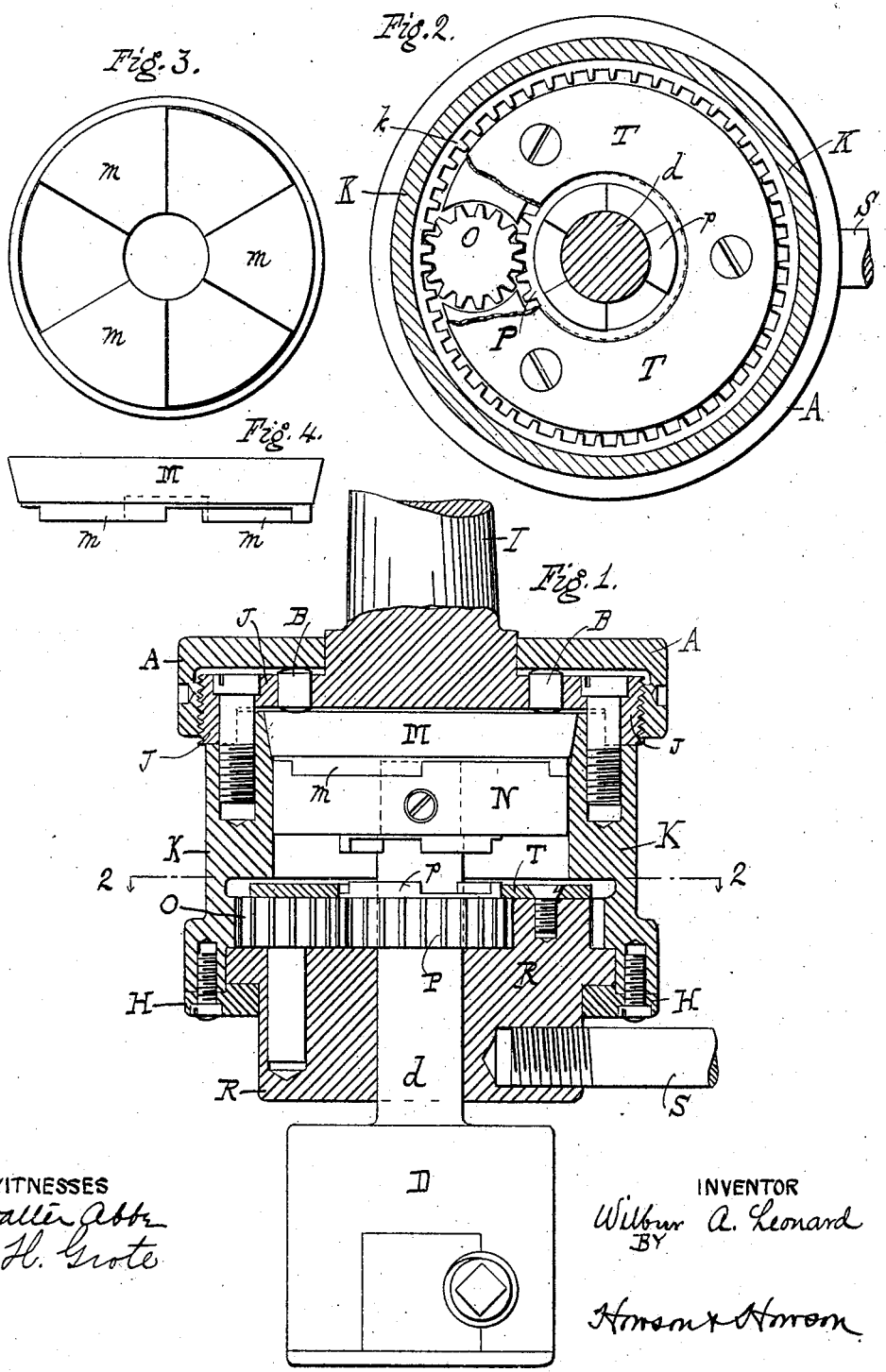
WITNESSES
INVENTOR
Wilbur A. Leonard
BY
ATTORNEYS
THE NORRIS PETERS CO., WASHINGTON, D. C.

UNITED STATES PATENT OFFICE.

WILBUR A. LEONARD, OF NEW HAVEN, CONNECTICUT, ASSIGNOR TO GEOMETRIC TOOL COMPANY, OF NEW HAVEN, CONNECTICUT, A CORPORATION OF CONNECTICUT.

TAP-HOLDER.

No. 876,723.      Specification of Letters Patent.      Patented Jan. 14, 1908.

Application filed May 27, 1907. Serial No. 375,948.

*To all whom it may concern:*

Be it known that I, WILBUR A. LEONARD, a citizen of the United States of America, residing at New Haven, in the county of New Haven, in the State of Connecticut, have invented a certain new and useful Improved Tap-Holder, of which the following is a specification.

The object of my invention is to so construct a tapping head or holder that if the tap catch in the work, danger of breaking the tap will nevertheless be avoided. This object I attain by the construction which I will now describe.

In the accompanying drawing Figure 1 is a vertical section of my improvement as applied to a tap holder of the reversing type; Fig. 2 is a sectional plan on the line 2—2, Fig. 1; Fig. 3 is an inverted plan view; and Fig. 4 is an edge view of the friction disk detached.

The casing comprises a shank I, with flange J and a shell K, bolted to the flange. Within the shell is a body part R, retained by means of a ring H, bolted to the lower face of the shell. In the upper part of the shell is a friction disk M, the periphery being made somewhat tapering to fit the correspondingly tapered inner face of the upper end of the shell. The under face of the disk is made with radial teeth $m$ to engage corresponding teeth on the clutch disk N, which is the driven member of the clutch and is pinned to the spindle $d$ of the chuck D carrying the tap.

In combination with the disk M, I provide means whereby it may be held to the shell with greater or less friction. For this purpose I provide pins B fitting freely into holes in the flange J and bearing on the back of the disk, while a cap or collar A screwed upon the flange J bears upon the pins. By screwing this cap up or down, as required, the disk M can be caused to bear with greater or less friction upon the shell, dependent upon the size of the tap to be driven. This friction can thus be adjusted to the requirements of the work so as to give sufficient driving power for tapping, should the tap catch in the work, the disk M will slip in the shell, and breakage be avoided.

I have shown my invention as applied to a reversing tap holder. In the construction illustrated there is a gear wheel P fitting freely around the spindle $d$ of the chuck and seating in a recess in the body R. On the upper face of this wheel P, I provide clutch teeth $p$ to engage clutch teeth on the underside of the disk N. Into the peripheral teeth of this wheel P gears a pinion O, having an axis turning in a bearing in the body R and meshing with an interval gear K. A ring T secured by screws to the body R retains the pinion O and gear wheel P in their places. A lever S is used to hold the body R from turning. The tap holder thus constructed is fastened in the spindle of the drill press, lathe or other suitable machine, by means of the shank I. The clutch member N being in contact with the member M, carried by the flange of the shank, this clutch member M and the chuck are revolved right-handed, while the gears O, P run idly. The spindle of the drill press is lowered or moved to carry the tap into the work until its stop is reached. Then the spindle of the drill press is moved back and the spindle I, shell K, and body R are drawn back, thereby throwing the clutch member N into contact with driven gear P, whereupon owing to the continued rotating of the spindle and shell, a reverse motion will be imparted through the gear to the clutch piece N, and hence to the chuck and tap to withdraw the latter from the work, and owing to the relative sizes of the gears $k$, O, P, the tap will be withdrawn or backed out of the work very quickly, say twice as fast as in the forward or tapping motion.

I claim as my invention

1. A tap holder having a shank, shell and chuck with a friction disk in the shell, a screw cap and pins to bear on the disk to adjust the friction of the latter against the shell.

2. A tap holder having a shank and shell with a chuck, a reversing clutch in the shell, a friction disk with which the movable member of the clutch may engage, and means for adjusting the friction of the disk in the shell.

In testimony whereof I have signed my name to this specification, in the presence of two subscribing witnesses.

WILBUR A. LEONARD.

Witnesses:
  HOWARD E. ADT,
  GEO. T. CASE.